US007627020B2

(12) United States Patent
Demir et al.

(10) Patent No.: US 7,627,020 B2
(45) Date of Patent: *Dec. 1, 2009

(54) ACQUISITION CIRCUIT FOR LOW CHIP RATE OPTION FOR MOBILE TELECOMMUNICATION SYSTEM

(75) Inventors: Alpaslan Demir, East Meadow, NY (US); Fatih M. Ozluturk, Port Washington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/176,850

(22) Filed: Jul. 21, 2008

(65) Prior Publication Data

US 2008/0298529 A1   Dec. 4, 2008

Related U.S. Application Data

(63) Continuation of application No. 11/352,570, filed on Feb. 13, 2006, now Pat. No. 7,403,555, which is a continuation of application No. 10/832,847, filed on Apr. 27, 2004, now Pat. No. 7,027,495, which is a continuation of application No. 10/267,512, filed on Oct. 9, 2002, now Pat. No. 6,760,365.

(60) Provisional application No. 60/328,590, filed on Oct. 11, 2001.

(51) Int. Cl.
    *H04B 1/707*   (2006.01)
(52) U.S. Cl. .................. 375/145; 375/149; 375/354
(58) Field of Classification Search ................ 375/145, 375/149, 354, 365–368
    See application file for complete search history.

(56) References Cited

U.S. PATENT DOCUMENTS 5,101,416 A    3/1992   Fenton et al.

(Continued)

FOREIGN PATENT DOCUMENTS

EP          0924868         6/1999

(Continued)

OTHER PUBLICATIONS

"Method and Principal of Uplink Synchronization," TSGR1#(99)624, TSG-RAN Working Group 1 (Radio) meeting #5, Cheju, South Korea, Jun. 1-4, 1999.

(Continued)

*Primary Examiner*—Kevin Y Kim
(74) *Attorney, Agent, or Firm*—Volpe and Koenig PC

(57) ABSTRACT

A User Equipment (UE) receives and samples communication signals, where the communication signals have a time frame format, a transmission chip rate and a synchronization code associated with a time slot that includes a midamble that indicates a modulation of the synchronization code where a specified modulation of received synchronization codes identifies the timing for a timeslot in which data is to be received. The UE preferably includes a synchronization code determination circuit, a midamble determination circuit, and a phase modulation sequence detection circuit operatively associated with the midamble determination circuit. The UE can be configured for use with the low chip rate option of the Third Generation Partnership Project (3GPP) Universal Mobile Telecommunication System (UMTS) standards that employ a predefined set of downlink SYNC codes that point to midambles which indicate SYNC code modulation sequence to enables reading of data in a subsequent Broadcast Channel (BCH) message.

28 Claims, 4 Drawing Sheets

U.S. PATENT DOCUMENTS

| | | | |
|---|---|---|---|
| 5,592,518 | A | 1/1997 | Davis et al. |
| 5,793,772 | A | 8/1998 | Burke et al. |
| 5,822,359 | A | 10/1998 | Bruckert et al. |
| 6,078,607 | A | 6/2000 | Monroe et al. |
| 6,188,679 | B1 | 2/2001 | Sato |
| 6,909,739 | B1 | 6/2005 | Eerola et al. |
| 6,993,084 | B1 | 1/2006 | Eberlein et al. |
| 6,993,094 | B1 | 1/2006 | Eberlein et al. |
| 7,133,439 | B1 | 11/2006 | Kakehi |
| 2001/0004380 | A1 | 6/2001 | Mannermaa |
| 2002/0034944 | A1 | 3/2002 | Tanno et al. |
| 2002/0057664 | A1 | 5/2002 | Sarkar et al. |
| 2002/0061005 | A1 | 5/2002 | Lee et al. |
| 2002/0064211 | A1 | 5/2002 | Chen et al. |

FOREIGN PATENT DOCUMENTS

| | | |
|---|---|---|
| EP | 1 241 817 | 9/2002 |
| JP | 05-292060 | 11/1993 |
| JP | 08-111653 | 4/1996 |
| JP | 10-312373 | 11/1998 |
| JP | 11-112384 | 4/1999 |
| JP | 11-187450 | 7/1999 |
| JP | 2000-036774 | 2/2000 |
| JP | 2000-138649 | 5/2000 |
| JP | 2001-077725 | 3/2001 |
| KR | 100585980 | 5/2006 |
| WO | 00/74276 A | 12/2000 |
| WO | 01/52579 | 7/2001 |
| WO | 03/032512 | 4/2003 |

OTHER PUBLICATIONS

"Frame Structure for Low Chip Rate TDD Option," TSGR1#10(00)0092, TSG RAN Working Group 1 meeting #10, Beijing, China, Jan. 18-21, 2000.

"Operating Scenarios for the Unpaired TDD Spectrum," TSGR1#12(00)0524, TSG-RAN Working Group 1 meeting #12, Seoul, Korea, Apr. 10-13, 2000.

"Cell Search for 1.28Mcps TDD," TSGR1(00)1020, TSG-RAN Working Group 1 meeting #15, Berlin Germany, Aug. 22-25, 2000.

"Sychronization Codes for 1.28Mcps TDD," TSGR1(00)1023, TSG-RAN Working Group 1 meeting #15, Berlin, Germany, Aug. 22-25, 2000.

Kim, et al., "Distributed Sample Acquisition-Based Fast Cell Search in Inter-Cell Asynchronous DS/CDMA Systems," IEEE Journal on Selected Areas in Communications, vol. 18, No. 8, pp. 1455-1469, Aug. 2000.

Sriram, et al., "Low-Power Correlator Architectures for Wideband CDMA Code Acquisition," Signals, Systems and Computers, 1999, Conference Record of the Thiry-Third Asilomar Conference, Oct. 24-27, vol. 14, pp. 125-129, Piscataway, NJ, USA, Oct. 24-27, 1999.

Third Generation Partnership Project, "Technical Specification Group Radio Access Network; Physical Channels and Mapping of Transport Channels onto Physical Channels (TDD) (Release 1999)," 3GPP TS 25.221 v3.8.0 (Sep. 2001).

Third Generation Partnership Project, "Technical Specification Group Radio Access Network; Physical Channels and Mapping of Transport Channels onto Physical Channels (TDD) (Release 1999)," 3GPP TS 25.221 v3.11.0 (Sep. 2002).

Third Generation Partnership Project, "Technical Specification Group Radio Access Network; Physical Channels and Mapping of Transport Channels onto Physical Channels (TDD) (Release 4)," 3GPP TS 25.221 v4.2.0 (Sep. 2001).

Third Generation Partnership Project, "Technical Specification Group Radio Access Network; Physical Channels and Mapping of Transport Channels onto Physical Channels (TDD) (Release 4)," 3GPP TS 25.221 v4.8.0 (Jun. 2005).

Third Generation Partnership Project, "Technical Specification Group Radio Access Network; Physical Channels and Mapping of Transport Channels onto Physical Channels (TDD) (Release 5)," 3GPP TS 25.221 v5.2.0 (Sep. 2002).

Third Generation Partnership Project, "Technical Specification Group Radio Access Network; Physical Channels and Mapping of Transport Channels onto Physical Channels (TDD) (Release 5)," 3GPP TS 25.221 v5.6.0 (Jun. 2005).

Third Generation Partnership Project, "Technical Specification Group Radio Access Network; Physical Channels and Mapping of Transport Channels onto Physical Channels (TDD) (Release 6)," 3GPP TS 25.221 v6.5.0 (Sep. 2005).

Third Generation Partnership Project, "Technical Specification Group Radio Access Network; Spreading and Modulation (TDD) (Release 1999)," 3GPP TS 25.223 v3.7.0 (Sep. 2001).

Third Generation Partnership Project, "Technical Specification Group Radio Access Network; Spreading and Modulation (TDD) (Release 1999)," 3GPP TS 25.223 v3.8.0 (Mar. 2002).

Third Generation Partnership Project, "Technical Specification Group Radio Access Network; Spreading and Modulation (TDD) (Release 4)," 3GPP TS 25.223 v4.2.0 (Sep. 2001).

Third Generation Partnership Project, "Technical Specification Group Radio Access Network; Spreading and Modulation (TDD) (Release 4)," 3GPP TS 25.223 v4.5.0 (Dec. 2002).

Third Generation Partnership Project, "Technical Specification Group Radio Access Network; Spreading and Modulation (TDD) (Release 5)," 3GPP TS 25.223 v5.1.0 (Jun. 2002).

Third Generation Partnership Project, "Technical Specification Group Radio Access Network; Spreading and Modulation (TDD) (Release 5)," 3GPP TS 25.223 v5.3.0 (Mar. 2003).

Third Generation Partnership Project, "Technical Specification Group Radio Access Network; Spreading and Modulation (TDD) (Release 6)," 3GPP TS 25.223 v6.1.0 (Dec. 2005).

Third Generation Partnership Project, "Technical Specification Group Radio Access Network; Physical Layer Procedures (TDD) (Release 1999)," 3GPP TS 25.224 v3.8.0 (Sep. 2001).

Third Generation Partnership Project, "Technical Specification Group Radio Access Network; Physical Layer Procedures (TDD) (Release 1999)," 3GPP TS 25.224 v3.13.0 (Sep. 2003).

Third Generation Partnership Project, "Technical Specification Group Radio Access Network; Physical Layer Procedures (TDD) (Release 4)," 3GPP TS 25.224 v4.2.0 (Sep. 2001).

Third Generation Partnership Project, "Technical Specification Group Radio Access Network; Physical Layer Procedures (TDD) (Release 4)," 3GPP TS 25.224 v4.11.0 (Sep. 2004).

Third Generation Partnership Project, "Technical Specification Group Radio Access Network; Physical Layer Procedures (TDD) (Release 5)," 3GPP TS 25.224 v5.2.0 (Sep. 2002).

Third Generation Partnership Project, "Technical Specification Group Radio Access Network; Physical Layer Procedures (TDD) (Release 5)," 3GPP TS 25.224 v5.9.0 (Dec. 2005).

Third Generation Partnership Project, "Technical Specification Group Radio Access Network; Physical Layer Procedures (TDD) (Release 6)," 3GPP TS 25.224 v6.6.0 (Dec. 2005).

Yin, "Overview of TD CDMA System for Mobile Communications (TSM)—Architecture, Protocols, and Air Interface," Siemens Telecommunication Systems Limited, Sep. 12, 2001.

ACQUISITION CIRCUIT FOR LOW CHIP RATE OPTION FOR MOBILE TELECOMMUNICATION SYSTEM

CROSS REFERENCE TO RELATED APPLICATIONS

This application is a continuation of U.S. patent application Ser. No. 11/352,570, filed Feb. 13, 2006, now U.S. Pat. No. 7,403,555, which is a continuation of U.S. patent application Ser. No. 10/832,847, filed Apr. 27, 2004, now U.S. Pat. No. 7,027,495, which is a continuation of U.S. patent application Ser. No. 10/267,512, filed Oct. 9, 2002, now U.S. Pat. No. 6,760,365, which claims the benefit of U.S. Provisional Patent Application No. 60/328,590, filed Oct. 11, 2001, which are incorporated by reference as if fully set forth.

FIELD OF INVENTION

The present invention relates to the field of wireless communication. Specifically, the present invention relates to enabling the synchronization step between the User Equipment and the base station in the low chip rate option (1.28 Mcps) of Universal Mobile Telecommunication System (UMTS) Time Division Duplex (TDD) and TD-SCDMA.

BACKGROUND

In order to establish communications in a wireless system a User Equipment (UE) must first synchronize with a base station. Once synchronization is established, the substantive communication and/or data transfer may occur such that a wireless telephone call may be conducted.

The 3rd Generation Partnership Project (3GPP) in, for example, 3GPP TS 25.221 v5.2.0, 3GPP TS 25.223v5.1.0 and 3GPP TS 25.224 v5.2.0, specifies communication systems that employ a relatively high chip rate of 3.84 Mcps or, optionally, a relatively low chip rate of 1.28 Mcps. In the specified high rate option, a User Equipment (UE) searches for a known Primary Synchronization Code (PSC) and then identifies one of a number of different groups of secondary synchronization codes. However, there is no single PSC in the low chip rate option. A UE must search for a downlink synchronization code SYNC-DL which may be one of 32 different 64 element sequences.

FIG. 1 illustrates the time frame structure for the 1.28 Mcps low chip rate option of a wireless system as currently specified by 3GPP. Ten (10) ms frames are divided into two sub-frames of five (5) ms each. Each sub-frame includes seven (7) timeslots and a separate area for uplink and downlink synchronization (SYNC) signals. Each Timeslot 0-6 is configured to receive communication data symbols and an identifying midamble code. Timeslot 0 is always a downlink (DL) slot. Timeslot 1 is always an uplink (UL) slot. Timeslots 2-6 are configurable for either UL or DL usage.

Between Timeslot 0 and Timeslot 1, there exists a ninety-six (96) chip long Downlink Pilot Timeslot (DwPTS), a ninety-six (96) chip long guard period (GP) and a one-hundred sixty (160) chip long uplink pilot timeslot (UpPTS). Within the DwPTS there is a thirty-two (32) chip long guard period and a 64 chip Synchronous (SYNC-DL) code section. In addition, every two (2) frames (four sub-frames) defines a 20 ms superframe.

In the current 3GPP system specification, there are thirty-two (32) SYNC-DL codes, each having sixty four (64) elements. Each SYNC-DL code points to four basic midamble codes (of length 128) so that there are total of 128 basic midamble codes. In addition, each timeslot's midamble code (of length 144) is generated from a basic midamble code (of length 128). From each basic midamble code, up to 16 timeslot midamble codes of length 144 can be generated.

Quadrature Phase Shift Keying (QPSK) modulation is used on the SYNC-DL codes. In each sub-frame, the midamble code in the DL Timeslot 0 provides a QSPK phase reference of the SYNC-DL code in the DwPTS. Accordingly, once the midamble code of Timeslot 0 is determined the QPSK modulation of a SYNC-DL code in the DwPTS of the sub-frame can be ascertained. The timing of the superframe (SFT) is indicated by a specified sequence of the Quadrature Phase Shift Keying (QPSK) modulation on the SYNC-DL code over a specified number of sequential sub-frames.

An objective of synchronization is to be able to receive data of a broadcast channel (BCH) which is carried by a Primary Common Control Physical Channel (P-CCPCH) in Timeslots 0 of a superframe. Presently, two different sequences of SYNC-DL code modulation are specified for four sequential DwPTS in a superframe, 3GPP TS 25.223 v5.1.0 Sec. 9.1.1. A first sequence, S1, indicates that there is a P-CCPCH carrying a BCH in the next superframe; a second sequence, S2, indicates that there is no such P-CCPCH in the next superframe. Where sequence S1 of the modulation of the SYNC-DL codes of a superframe is found, the data from the BCH can be read from the P-CCPCH of the next superframe.

Annex D of 3GPP TS 25.224 V5.2.0 suggests a four step procedure for UE determination of synchronization which is graphically depicted in FIG. 2. The first step requires the system to search through the 32 codes to determine which SYNC-DL code is being received and to determine the code timing, i.e. where in the stream of received data the DwPLTSs carrying the SYNC-DL code are located as a reference with respect to the system time frame structure. Step two of the process determines which one of the four basic midamble codes, as indicated by the SYNC-DL, is used. This is completed by processing the midamble section of Timeslot 0 (P-CCPCH). Since the midamble and the scrambling code are tied together on a one-to-one correlation, once midamble is known, the scrambling code is also known. If this step fails, the first step is repeated.

During step three, the process determines the phases of the QPSK modulation that is on the SYNC code over multiple sub-frames and from this the superframe timing (SFT) is determined. At step four, the complete broadcast channel (BCH) information is read by the UE.

In view of the provision for the 1.28 Mcps option, there is a need for a UE which has a receiver capable of conducting synchronization in an efficient manner without undo hardware cost.

SUMMARY

A User Equipment (UE) is provided to receive and sample communication signals, where the communication signals have a time frame format, a transmission chip rate and a synchronization code associated with a time slot that includes a midamble that indicates a modulation of the synchronization code where the synchronization code is one of a predefined set of synchronization codes and a specified modulation of received synchronization codes identifies the timing for a timeslot in which data is to be received. The UE preferably includes a synchronization code determination circuit, a midamble determination circuit, and a phase modulation sequence detection circuit operatively associated with the midamble determination circuit and the synchronization code determination circuit to determine sequences of phase modulation of consecutive detected synchronization codes based on positive correlations of synchronization codes detected by the synchronization code determination circuit and a respective midamble determined by the midamble determination circuit.

The UE can be configured for use with the low chip rate option of the Universal Mobile Telecommunication System (UMTS) Time Division Duplex (TDD) standard as formulated by the Third Generation Partnership Project (3GPP) that employs a predefined set of downlink SYNC code that point to midambles which indicate SYNC code modulation sequence to enables reading of data in a subsequent Broadcast Channel (BCH) message.

The present invention implements the basic acquisition steps in a reliable efficient manner. The first step is detection of the base synchronization (SYNC-DL) code, step two is the detection of the midamble used, step three is the detection of the superframe timing. Completion of these steps enables reading of the full BCH message.

The User Equipment (UE) is preferably configured for use in a wireless telecommunications system which utilizes a time frame format where base stations transmit in a down link pilot timeslot a synchronization code selected from a predetermined number X of downlink synchronization codes of Y sequential elements, where X and Y are integers greater than 15. In the low chip rate option of 3GPP, X and Y are currently specified as 32 and 64, respectively. The signals are transmitted at a predetermined chip rate and the UE receives communications signals and samples them at a sampling rate which is at least as fast as the chip rate The UE preferably has a synchronization circuit for processing the received communication signal samples. The synchronization circuit has a synchronization code determination circuit which receives samples at an input rate which is at least as fast as the chip rate and processes sets of sequential samples at a processing rate faster than the sample input rate. The synchronization code determination circuit includes a plurality M of Y element correlators, where $M \leq X/2$, which each have an input for receiving in parallel at the sample input rate received communication signal samples. The correlators correlate each set of samples with at least two synchronization codes of the set of X downlink synchronization codes. A detection circuit is operatively associated with the correlators to detect and track positive correlations of downlink synchronization codes with sequential sample sets. Each correlator has an output for outputting code correlations for each set of samples at at least twice the sample input rate such that collectively the correlators output to the detection circuit correlation data for all X synchronization codes before processing further communication signal samples.

Where the predetermined number of downlink synchronization codes is 32, each having 64 sequential elements, there are no more than 16 correlators in the synchronization code determination circuit. Preferably, there are no more than 8 correlators in the synchronization code determination circuit for the currently specified 3GPP type system. Each correlator receives in parallel, at the sample input rate, received communication signal samples and correlates each set of samples with at least four synchronization codes of the set of 32 downlink synchronization codes during one input rate period. Preferably, each correlator in the synchronization code determination circuit includes N matched filters which each correlate 64/N element segments of received communication signal sample sets with corresponding 64/N element segments of at least four synchronization codes of the set of 32 downlink synchronization codes during one input rate period.

In one embodiment, each correlator in the synchronization code determination circuit includes 8 matched filters which correlate 4-element segments.

The UE preferably receives data of a specified channel (BCH) which is carried on a primary common control physical channel (P-CCPCH) in selected timeslots of a predefined system time frame structure to enable the UE to proceed with bi-directional communication with a base station which transmitted the BCH data. Each transmitted downlink synchronization code has a modulation which is indicated by a midamble transmitted in a specified timeslot and a specified modulation sequence of consecutive downlink synchronization codes identifies the location of the BCH data. Accordingly, the UE also preferably has a midamble determination circuit and a phase modulation sequence detection circuit. The midamble determination circuit is operatively associated with the synchronization code determination circuit to determine the respective transmitted midamble based on the relative location and to identity of a detected downlink synchronization code. The phase modulation sequence detection circuit is operatively associated with the midamble determination circuit and the synchronization code determination circuit to determine sequences of phase modulation of consecutive detected downlink synchronization codes based on downlink synchronization codes detected by the synchronization code determination circuit and the midamble determined by the midamble determination circuit.

Preferably, the synchronization code determination circuit includes a noise estimation circuit and an Automatic Frequency Control circuit (AFC) associated with synchronization code determination circuit's detection circuit. The noise estimation circuit provides the detection circuit with a noise estimate upon which synchronization code detection is based. The detection circuit controls the AFC to produce a frequency correction signal which is mixed with received communication samples input to the midamble generating circuit.

In the low chip rate 3GPP specified system, each synchronization code points to a predefined set of midambles from which one is transmitted with each transmitted downlink synchronization code to indicate the modulation of that transmitted code. Accordingly, the midamble determination circuit preferably includes a buffer, at least one midamble correlator, a midamble generator and a midamble decision circuit. The buffer has an input for receiving AFC corrected communication samples from the synchronization code determination circuit. The midamble generator has an input for receiving the determined synchronization code from the synchronization code determination circuit and sequentially generates midambles based on the predefined set of midambles to which the determined synchronization code points. The midamble correlator has an input for receiving sets of signal samples from the buffer corresponding to a midamble portion of the specified timeslot, an input for receiving generated midambles from the midamble generator and an output for outputting correlation data to the midamble decision circuit. The midamble decision circuit determines which of the midambles of the predefined set of midambles to which the determined synchronization code points was transmitted with the determined synchronization code based on correlation data between sets of signal samples from the buffer corresponding to a midamble portion of the specified timeslot and generated midambles from the midamble generator. The midamble decision circuit has an output for outputting a selection signal to the midamble generator which in turn has an output which outputs a midamble based on the selection signal to the phase modulation sequence detection circuit. Preferably, there are a plurality of midamble correlators and the correlators in the synchronization code determination circuit are used as the midamble correlators.

The phase modulation sequence detection circuit preferably includes a buffer, a phase correlator means, and a phase sequence decision circuit. The phase modulation sequence detection circuit's buffer has an input for receiving communication samples from the synchronization code determination circuit. The phase correlator means receives sets of signal samples from the phase modulation sequence detection circuit's buffer corresponding to synchronization code portions of the received signal samples, receives the selected midamble from the midamble generator and outputs phase correlation data to the sequence decision circuit. The sequence decision circuit identifies phases sequences of consecutive sets of signal samples corresponding to the determined synchronization code. The sequence decision circuit has an input for receiving phase correlation data from the phase correlator means and an output for outputting a signal identifying the location of the BCH data when a specified phase sequence is detected. Optionally, the buffer in the midamble determination circuit is used as the phase modulation sequence detection circuit's buffer.

Other objects and advantages of the present invention will be apparent to those skilled in the art from the following detailed description.

DETAILED DESCRIPTION OF THE PREFERRED EMBODIMENT(S)

Figure 1:
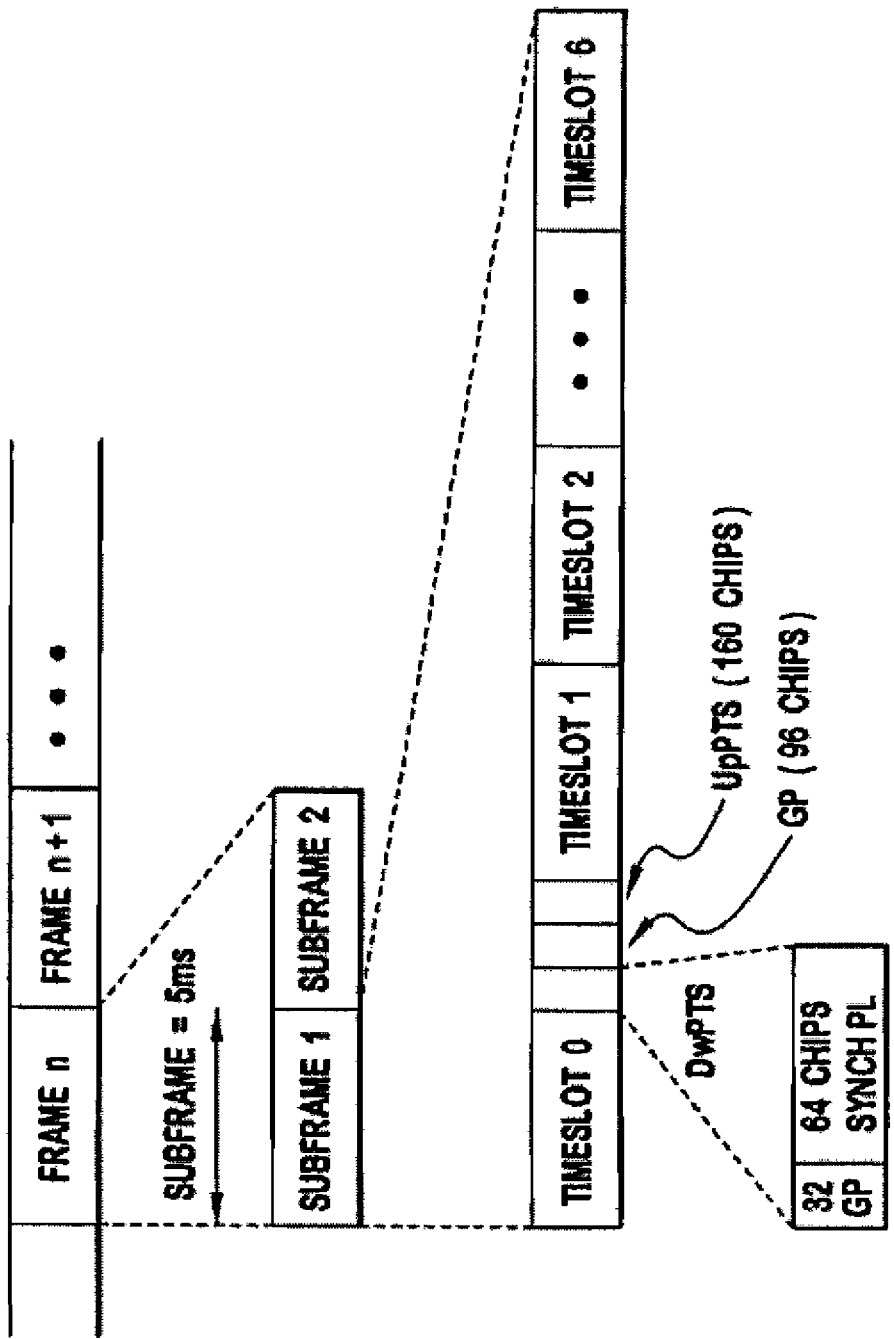
FIG. 1 is a burst diagram illustrating the frame structure for the 1.28 Mcps option of a 3GPP system.
Figure 2:
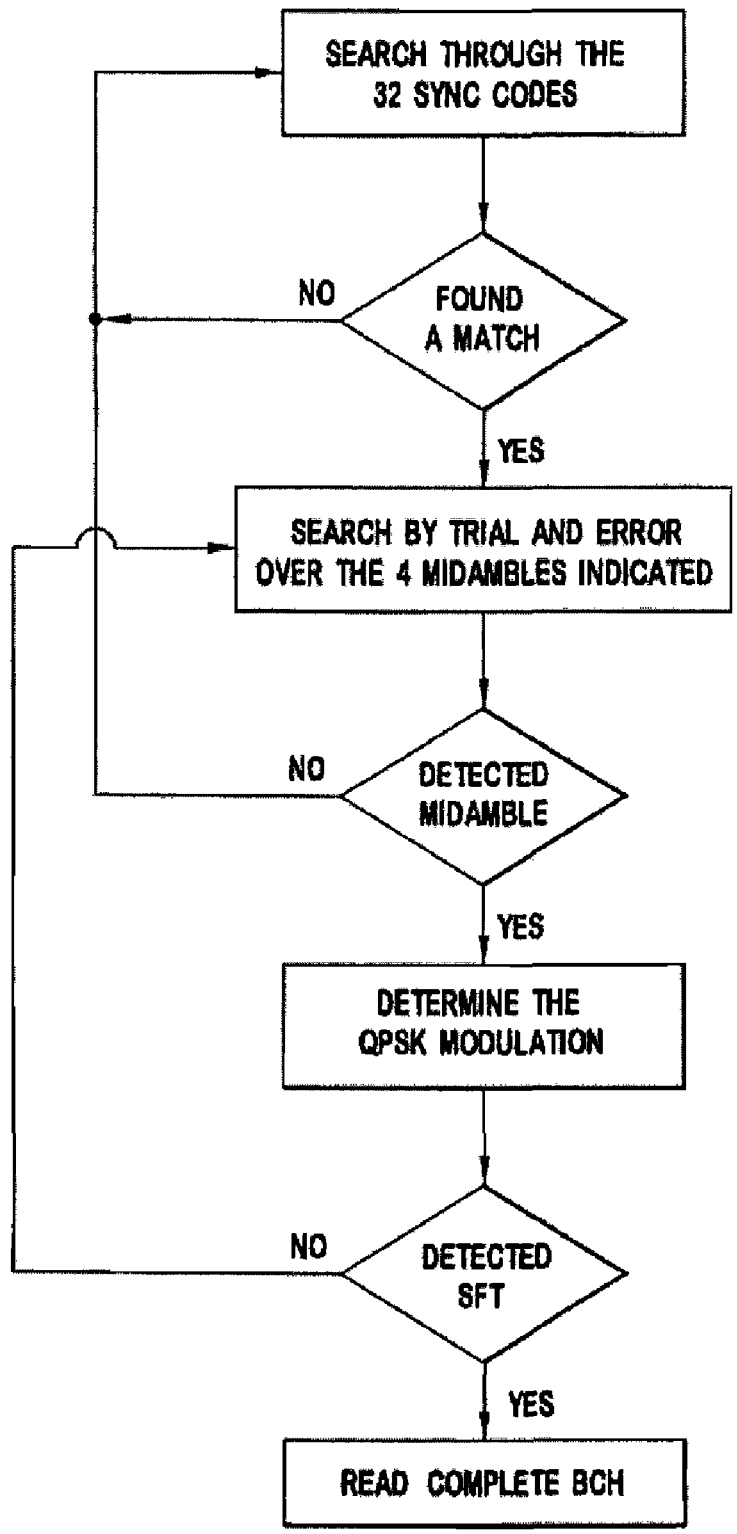
FIG. 2 is a flow chart of a process for establishing synchronous communication by a UE in the context of the 1.28 Mcps option of a 3GPP system.
Figure 3:
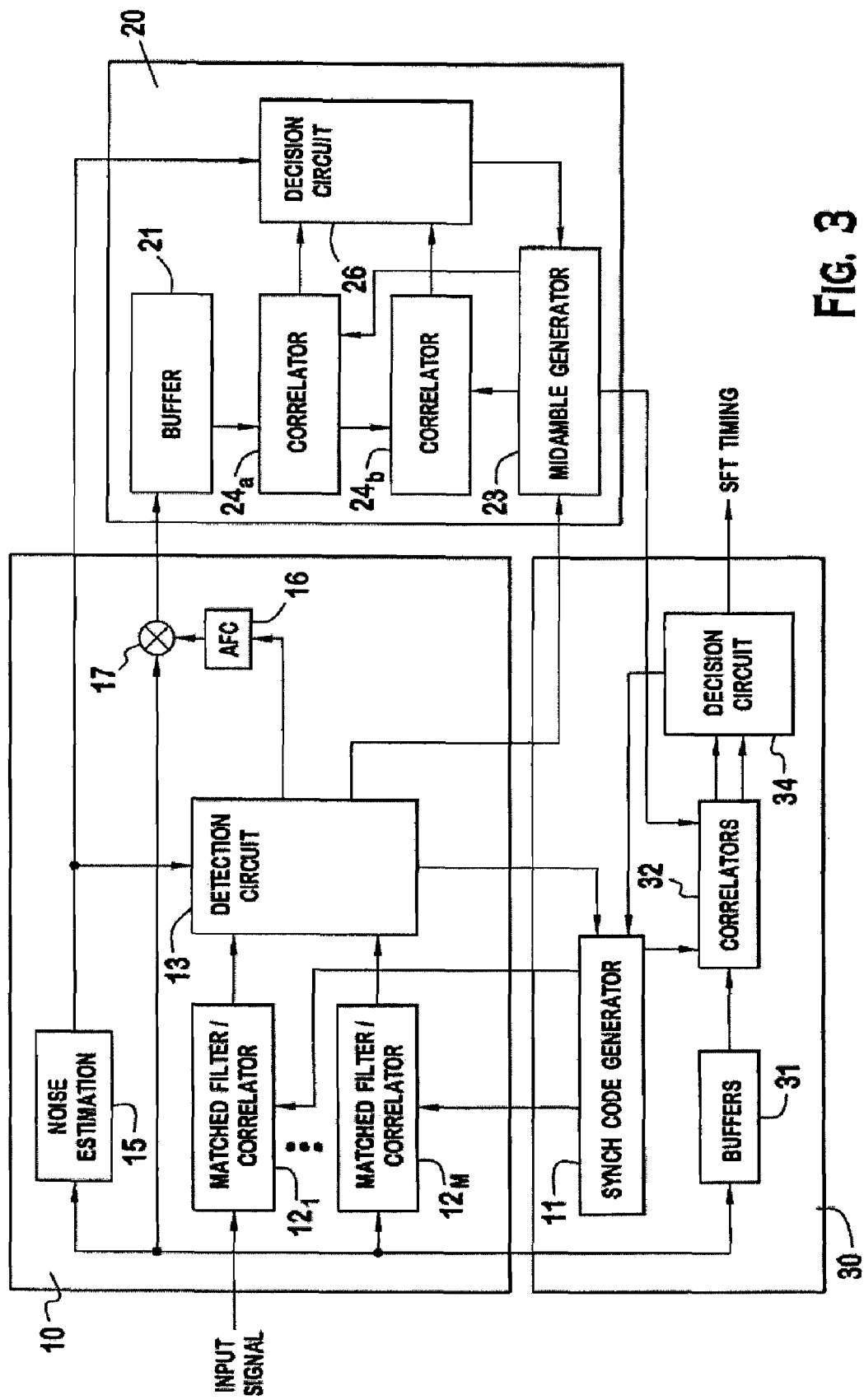
FIG. 3 is a block diagram illustrating components of a UE receiver made in accordance with the teachings of the present invention.

Referring to FIG. 3, there is shown a block diagram of a portion of a receiver for a user equipment (UE) for use in conjunction with a wireless telecommunication system in accordance with current 3GPP specification utilizing a 1.28 Mcps chip rate. The UE receives wireless signals via an antenna (not shown) and samples of them using at least the chip rate of 1.28 Mcps. Preferably, sampling is done at twice the chip rate or at some other multiple of the chip rate. A sampling rate higher than the chip rate improves performance, but too high of a sampling rate can require the expense of additional processing equipment in order to maintain sufficient processing speed. Where sampling is done at twice the chip rate, various processing options are available as known in the art. For example, alternate samples may be processed independently as two different data streams or, alternatively, the samples may be selectively combined in accordance with conventional methods.

The synchronization processing circuit shown in FIG. 3 is designed to generate information regarding the timing of the communication signals sent by a base station in accordance with the 3GPP specified 1.28 Mcps option frame formatting to enable the UE to communicate with that base station. When an appropriate modulation sequence of SYNC-DL codes is detected, such as sequence S1 above, the UE can then read data sent by the base station in a broadcast channel (BCH) which is carried on a P-CCPCH in the Timeslots 0 of a superframe which then enables the UE to proceed with bi-directional communication with the base station which sent the BCH data. The synchronization processing circuit has three main components: a SYNC-DL determination circuit 10, a midamble determination circuit 20 and a phase modulation sequence detection circuit 30.

The SYNC-DL determination circuit 10 includes a plurality of M parallel matched filter/correlators $12_1$ through $12_M$ which output correlation data to a detection circuit 13. The received communication signal samples are input to each of the correlators $12_1$-$12_M$. Each correlator $12_1$-$12_M$ also has an input from a synchronization code generator 11 to enable it to correlate a set of samples being processed against one of the 32 different SYNC-DL codes.

Figure 4:
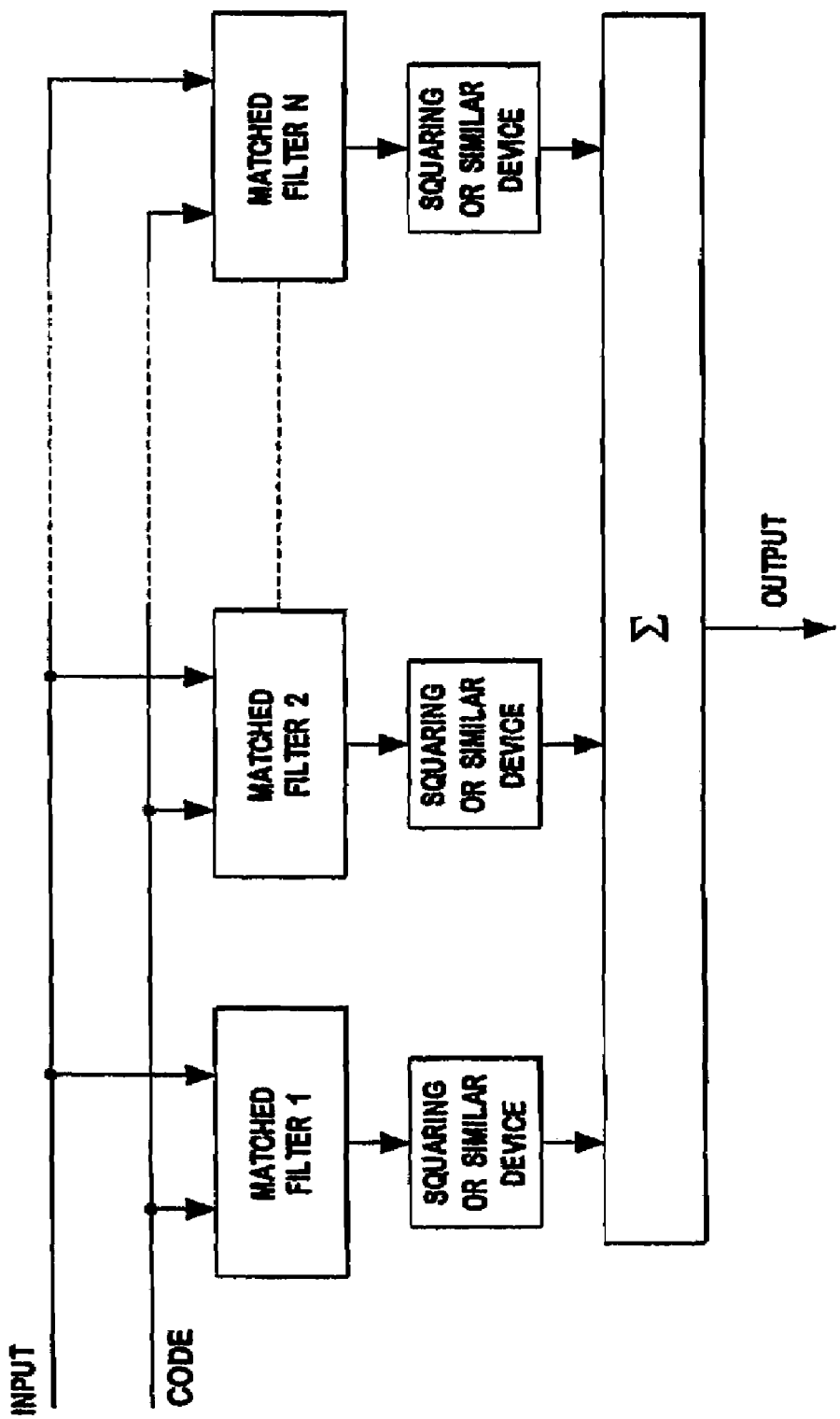
FIG. 4 is an expanded block diagram of a Matched Filter/Correlator component of the UE receiver of FIG. 3.

In the currently specified 1.28 Mcps option, each SYNC-DL code has 64 elements so that the correlators $12_1$-$12_M$ are configured to process sets of 64 received signal samples at one time. As shown in FIG. 4, each correlator of correlators $12_1$-$12_M$ is preferably configured as a bank of N matched filters, each with an associated squaring or similar device, and a summer. Each matched filter processes a different segment which is 64/N in length of a set of 64 received signal samples. Corresponding segments of a SYNC-DL code are directed to a code input of each of the matched filters. Each matched filter has an output which outputs a signal to a respective squaring or similar device which in turn collectively output signals to a summer which sums the collective segment outputs to provide an output of the correlator.

The correlators $12_1$-$12_M$ receive the signal samples at a first input rate, but operate much faster so that each correlator can output correlation data for at least two different SYNC-DL codes before processing subsequent signal samples. For example, with reference to FIG. 4, for a given sample input rate (ir), the code input rate from the SYNC-DL code generator 11 of, for example, the conventional 64 element SYNC-DL codes, is at least eight (8) code elements per ir period to each of the N matched filters where N=16. After each corresponding set of four elements of a SYNC-DL code is received by each of the sixteen matched filters, correlation data output is squared, collectively summed and then output whereby the first four element sets processed by the sixteen matched filters outputs a correlation for a first 64 element SYNC-DL code and the second four element sets processed by the sixteen matched filters outputs a correlation for a second 64 element SYNC-DL code. Since each correlator $12_1$-$12_M$ processes at least two SYNC-DL codes per sample input rate period, the number M of correlators which are required without incurring any significant processing delay is no more than half the number of possible codes.

In the preferred construction, each correlator $12_1$-$12_M$ preferably operates at a speed which processes four SYNC-DL codes per sample input rate period so that eight (M=8) correlators are used, i.e. the number of possible codes (32) divided by the rate factor (4). In the preferred embodiment each correlator is comprised of sixteen (N=16) matched filters of length four, i.e. code length (64) divided by number of segments (four). From an element processing perspective, for each element of signal sample which is processed 16 elements, i.e. four sets of four elements, of SYNC-DL codes are processed by each matched filter.

The detection circuit 13 receives the output from the correlators $12_1$-$12_M$ and tracks positive correlations over a selected number of frames. A noise estimation circuit 15 is provided which also receives the communication signal samples and outputs a noise estimate. The detection circuit 13 uses the noise estimate from the noise estimation circuit 15 to determine whether or not the output from one of the correlators $12_1$-$12_M$ is positive. Preferably, a positive correlation is detected when a correlator output for a SYNC-DL code correlation exceeds the noise estimate multiplied by a selected noise coefficient constant.

If the same SYNC-DL code generates a positive correlation at the same relative location over a plurality of sub-frames, preferably eight, the detection circuit determines that it has identified both the specific SYNC-DL code being received and the relative position of the DwPTS within the communication signal which in turn provides the location of Timeslot 0 of each of the sub-frames and the associated midamble.

Preferably, an Automatic Frequency Control (AFC) circuit 16 is provided which is controlled by the detection circuit 13 to adjust the frequency of the input signal which is fed to a buffer 21 of the midamble detection circuit 20. An output of the AFC is mixed with the signal sample input via a mixer 17 to provide a frequency adjusted sample input to the midamble detection circuit. AFC, carrier recovery, can be completed in conjunction with SYNC-DL code determination so that subsequent steps are able to perform coherent processing. With each positive detection of the SYNC-DL code, the detection circuit sends a control signal to the AFC 16. The AFC process is completed when the determination of the SYNC-DL by the detection circuit 13 is completed. As an alternative, the mixer 17 may be placed at the input of the SYNC-DL determination circuit 10 so that AFC corrections are made to the input signal which the circuit 10 is receiving while continuing its determination function. This alternate location for mixer 17 is also in advance of the input to the sequence determination circuit 30.

Once the SYNC-DL determination circuit 10 has determined which of the 32 SYNC-DL codes is being received from a base station, the midamble selection circuit 20 is able to operate to determine which of the four basic midambles are being utilized in the P-CCPCH transmitted by the base station which transmitted the received SYNC-DL code. In the currently specified 3GPP system, the P-CCPCH is comprised of two channels P-CCPCH1 and P-CCPCH2 which are mapped onto the first two code channels of sub-frame Timeslots 0.

The midamble selection circuit 20 includes a midamble generator which receives the SYNC-DL code identification and relative timing information from the detection circuit 13 of the SYNC-DL determination circuit 10. The midamble generator 23 then generates 144 bit midambles from each of the four 128 bit midambles associated with the SYNC-DL code which was previously identified by detection circuit 13. Having determined the relative position of the DwPTS, the samples corresponding to the location of sequential Timeslots 0 midamble are input from a buffer 21 to a matched filter/correlator 24a with respect to the first code channel representing P-CCPCH1 and to a matched filter/correlator 24b representing the second code channel P-CCPCH2. These inputs are correlated with to an input from the midamble generator 23 derived from each of the four basic midambles corresponding to the identified SYNC-DL code. The decision circuit 26 receives the correlation of each iteration comparison of midambles from matched filter/correlators 24a and 24b in order to identify which of the four midambles was transmitted by the base station. Preferably, this determination is made in comparison to a noise estimate received from noise estimator 15 multiplied by a second selected correlation factor constant.

The matched filter/correlators $12_1$-$12_M$ do not need to be used by the SYNC-DL determination circuit 10 when the midamble detection circuit 20 is determining the midamble. Accordingly, the midamble detection circuit 20 can be configured to use the matched filter/correlators $12_1$-$12_M$ as matched filter/correlators 24a and 24b. Reuse of the hardware provides efficient implementation.

Also, the use of two matched filter/correlators 24a and 24b can accommodate spaced time transmit diversity that may be used on the P-CCPCH. In this case, two midambles are used with one-half the power of one midamble in normal operation. Detection of both midambles occurs and the decision device combines them non-coherently.

When a positive midamble determination is made, the decision circuit 26 outputs a midamble select signal to the midamble generator 23 which in turn outputs the identified midamble to the sequence detection circuit 30.

The sequence detection circuit 30 includes a buffer 31 which receives the signal samples, modulation correlators 32 and a decision circuit 34. The buffer 21 of midamble determination circuit may be reused for buffer 31 in which case the sequence detection circuit takes advantage of the AFC without relocation of the mixer 17 as discussed above.

The sequence detection circuit 30 receives the identified SYNC-DL code and DwPTS location information from the detection circuit 13 of the SYNC-DL determination circuit 10 and the midamble data from the midamble detection circuit 20. The modulation correlators 32 receive input from the buffer 31 into which the received communication samples have been stored and output data to the decision circuit 34. The correlators 32 correlate the QPSK modulation of the SYNC-DL code in the DwPTS with the identified midamble for series of sub-frames. This information is output to the decision circuit 34. Separate correlators are provided to detect phases of SYNC-DL and midamble codes, respectively. Alternatively, a single correlator can be shared to detect phases of both SYNC-DL and midamble codes.

The decision circuit 34 calculates the phase effect between the determined midamble and four or more consecutive SYNC-DL codes. The decision circuit 34 determines whether or not a selected sequence has been detected, such as the S1 sequence referenced above. When the selected modulation sequence is detected, the decision circuit 34 outputs superframe timing (SFT) to identify the start of a superframe in which BCH data carried on the P-CCPCH in Timeslots 0. This is currently specified in 3GPP as the next superframe following an S1 sequence of modulations of the DwPTS.

What is claimed is:

1. A User Equipment (UE) for use in wireless telecommunications comprising:

a receiver configured to receive and sample communication signals, where the communication signals have a time frame format, a transmission chip rate and a synchronization code associated with a time slot that includes a midamble that indicates a modulation of the synchronization code where the synchronization code is one of a predefined set of synchronization codes and a specified modulation of received synchronization codes identifies the timing for a timeslot in which data is to be received;

a synchronization code determination circuit which processes sets of sequential communication signal samples within an input period which is based on an input rate that is at least as fast as the transmission chip rate including:

a correlator component configured to correlate a sequential sample set with each of the synchronization codes of the predefined set of synchronization codes within one input period; and a detection circuit operatively associated with the correlator component to detect and track positive correlations of synchronization codes with sequential sample sets;

a midamble determination circuit operatively associated with the synchronization code determination circuit and configured to determine midambles of positively correlated synchronization codes; and a phase modulation sequence detection circuit operatively associated with the midamble determination circuit and the synchronization code determination circuit to determine sequences of phase modulation of consecutive detected synchronization codes based on positive correlations of synchronization codes detected by the synchronization code determination circuit and a respective midamble determined by the midamble determination circuit.

2. The UE according to claim 1 wherein the correlator component comprises a plurality of correlators, each having an input for receiving in parallel communication signal samples and a second input for receiving synchronization code elements such that each correlator is configured to correlate a sequential sample set with at least two different synchronization codes within one input period.

3. The UE according to claim 2 where the input period is based on an input rate that is at least twice as fast as the transmission chip rate wherein there are no more than eight correlators in the correlator component which are each configured to receive in parallel and correlate a communication signal sample set at least four synchronization codes of a predefined set of at least thirty-two synchronization codes during one input period.

4. The UE according to claim 2 wherein each correlator includes matched filters which are each configured to correlate a subset of a signal sample set with a corresponding subset of elements of at least four synchronization codes of the predefined set of synchronization codes during one input period.

5. The UE according to claim 4 wherein each correlator includes sixteen matched filters which each are configured to correlate four element subsets of sixty-four element sample sets.

6. The UE according to claim 1 further comprising a noise estimation circuit configured to provide the synchronization code determination circuit and the midamble determination circuit with a noise estimate upon which synchronization code detection and midamble detection are respectively based.

7. The UE according to claim 6 further comprising an Automatic Frequency Control circuit (AFC) associated with the detection circuit of the synchronization code determination circuit such that the detection circuit controls the AFC to produce a frequency correction signal which is mixed with communication signal samples input to the midamble determination circuit.

8. The UE according to claim 1 further comprising an Automatic Frequency Control circuit (AFC) associated with the detection circuit of the synchronization code determination circuit such that the detection circuit controls the AFC to produce a frequency correction signal which is mixed with communication signal samples input to the midamble determination circuit.

9. The UE according to claim 8 wherein:

the midamble determination circuit includes a buffer, a midamble correlator component, a midamble generator and a midamble decision circuit;

the buffer being configured to receive AFC corrected communication signal samples from the synchronization code determination circuit;

the midamble generator being configured to receive determined synchronization codes from the synchronization code determination circuit and to sequentially generate midambles based on a predefined set of midambles to which a determined synchronization code points;

the midamble correlator component being configured to receive sets of communication signal samples from the buffer corresponding to a midamble portion of a respective timeslot and to also receive generated midambles from the midamble generator and being configured to output correlation data to the midamble decision circuit; and the midamble decision circuit being configured to determine which of the midambles of the predefined set of midambles to which the determined synchronization code points was included in the communication signals received with respective determined synchronization codes and being configured to output a selection signal to outputs a selected midamble to the phase modulation sequence detection circuit.

10. The UE according to claim 9 comprising a plurality of correlators which are used by both the midamble correlator component and the correlator component of the synchronization code determination circuit.

11. The UE according to claim 9 wherein:

the phase modulation sequence detection circuit includes a buffer, a phase correlator circuit, and a phase sequence decision circuit;

the phase modulation sequence detection circuit's buffer being configured to receive communication signal samples;

the phase correlator circuit being configured to receive sets of communication signal samples from the phase modulation sequence detection circuit's buffer corresponding to synchronization code portions of the received communication signal samples and to receive selected midambles from the midamble generator and being configured to output phase correlation data to the sequence decision circuit; and the sequence decision circuit being configured to identify phases sequences of consecutive sets of communication signal samples corresponding to determined synchronization codes based on phase correlation data received from the phase correlator circuit and being configured to output a signal identifying timing for a timeslot in which data is to be received when a specified phase sequence is detected.

12. The UE according to claim 11 wherein the buffer in the midamble determination circuit is used as the phase modulation sequence detection circuit's buffer.

13. The UE according to claim 1 wherein:

the phase modulation sequence detection circuit includes a buffer, a phase correlator circuit, and a phase sequence decision circuit;

the phase modulation sequence detection circuit's buffer being configured to receive communication signal samples;

the phase correlator circuit being configured to receive sets of communication signal samples from the phase modulation sequence detection circuit's buffer corresponding to synchronization code portions of the received communication signal samples and to receive selected midambles from the midamble determination circuit and being configured to output phase correlation data to the sequence decision circuit; and the sequence decision circuit being configured to identify phases sequences of consecutive sets of communication signal samples corresponding to determined synchronization codes based on phase correlation data received from the phase correlator circuit and being configured to output a signal identifying timing for a timeslot in which data is to be received when a specified phase sequence is detected.

14. The UE according to claim 13 further comprising:

a noise estimation circuit configured to provide the synchronization code determination circuit and the midamble determination circuit with a noise estimate upon which synchronization code detection and midamble detection are respectively based; and an Automatic Frequency Control circuit (AFC) associated with the detection circuit of the synchronization code determination circuit such that the detection circuit controls the AFC to produce a frequency correction signal which is mixed with communication signal samples input to the midamble determination circuit.

15. The UE according to claim 1 configured for with wireless communications conforming to a low chip rate option of the Universal Mobile Telecommunication System (UMTS) Time Division Duplex (TDD) standard as formulated by the Third Generation Partnership Project (3GPP) that employs a predefined set of downlink SYNC code that point to midambles which indicate SYNC code modulation sequence to enable reading of data in a subsequent Broadcast Channel (BCH) message.

16. A method for processing communication signals in wireless telecommunications comprising:

receiving and sampling communication signals, where the communication signals have a time frame format, a transmission chip rate and a synchronization code associated with a time slot that includes a midamble that indicates a modulation of the synchronization code where the synchronization code is one of a predefined set of synchronization codes and a specified modulation of received synchronization codes identifies the timing for a timeslot in which data is to be received;

processing sets of sequential communication signal samples within an input period which is based on an input rate that is at least as fast as the transmission chip rate including:

correlating a sequential sample set with each of the synchronization codes of the predefined set of synchronization codes within one input period; and detecting and tracking positive correlations of synchronization codes with sequential sample sets;

determining midambles of positively correlated synchronization codes; and determining sequences of phase modulation of consecutive detected synchronization codes based on positive correlations of synchronization codes detected by the synchronization code determination circuit and a respective midamble determined by the midamble determination circuit.

17. The method according to claim 16 wherein the correlating comprises using a plurality of correlators to receive in parallel communication signal samples and synchronization code elements such that each correlator correlates a sequential sample set with at least two different synchronization codes within one input period.

18. The method according to claim 17 where the input period is based on an input rate that is at least twice as fast as the transmission chip rate wherein no more than eight correlators are used in the set correlating and each correlator correlates each set of samples with at least four synchronization codes of a set of at least thirty-two synchronization codes during one input rate period.

19. The method according to claim 17 where each correlator includes matched filters which correlate a subset of a signal sample set with a corresponding subset of elements of at least four synchronization codes of the set of synchronization codes during one input period.

20. The method according to claim 19 where each correlator includes sixteen matched filters wherein each matched filter correlates four-element subsets of sixty-four-element sample sets.

21. The method according to claim 16 further comprising using a noise estimate as a respective basis for both synchronization code detection and midamble determination.

22. The method according to claim 16 further comprising producing a frequency correction signal that is mixed with communication signal samples to use in the midamble determination.

23. The method according to claim 22 wherein the midamble determination circuit includes:

buffering AFC corrected communication signal samples;

using determined synchronization codes to sequentially generate midambles based on a predefined set of midambles to which a determined synchronization code points;

using buffered sets of AFC corrected communication signal samples and generated midambles to derive midamble correlation data; and determining which of the midambles of the predefined set of midambles to which the determined synchronization code points was included in the communication signals received with respective determined synchronization codes to identify a selected midamble for use in the phase modulation sequence determination.

24. The method according to claim 23 comprising providing a plurality of correlators and using the correlators for both the midamble determination and the synchronization code determination.

25. The method according to claim 23 wherein the phase modulation sequence determination includes:

buffering communication signal samples;

using buffered sets of communication signal samples corresponding to synchronization code portions of the received communication signal samples and determined midambles to produce phase correlation data; and identifying phases sequences of consecutive sets of communication signal samples corresponding to determined synchronization codes based on the phase correlation data to generate a signal identifying timing for a timeslot in which data is to be received when a specified phase sequence is detected.

26. The method according to claim 25 wherein a buffer is provided and is used for buffering in both the midamble determination and the phase modulation sequence determination.

27. The method according to claim 16 wherein the phase modulation sequence determination includes:
  buffering communication signal samples;
  using buffered sets of communication signal samples corresponding to synchronization code portions of the received communication signal samples and determined midambles to produce phase correlation data; and
  identifying phases sequences of consecutive sets of communication signal samples corresponding to determined synchronization codes based on the phase correlation data to generate a signal identifying timing for a timeslot in which data is to be received when a specified phase sequence is detected.

28. The method according to claim 16 further comprising:
  using a noise estimation circuit to generate a noise estimate upon which synchronization code detection is based; and
  using an Automatic Frequency Control circuit (AFC) to produce a frequency correction signal which is mixed with communication signal samples prior to the correlating.

* * * * *